(12) United States Patent
Geva et al.

(10) Patent No.: US 12,253,346 B2
(45) Date of Patent: Mar. 18, 2025

(54) DETONATION CONTROL SYSTEMS UTILIZING A SMART SAFETY PIN

(71) Applicant: GATE TECHNOLOGIES LTD., Bareket (IL)

(72) Inventors: Amir Geva, Shoham (IL); Asaf Geva, Shoham (IL); Gal Geva, Shoham (IL)

(73) Assignee: GATE TECHNOLOGIES LTD., Bareket (IL)

( * ) Notice: Subject to any disclaimer, the term of this patent is extended or adjusted under 35 U.S.C. 154(b) by 176 days.

(21) Appl. No.: 18/205,557

(22) Filed: Jun. 4, 2023

(65) Prior Publication Data
US 2023/0400287 A1 Dec. 14, 2023

(30) Foreign Application Priority Data

Jun. 8, 2022 (IL) .......................................... 293692

(51) Int. Cl.
| | |
|---|---|
| F42B 3/10 | (2006.01) |
| F42C 13/04 | (2006.01) |
| F42C 15/42 | (2006.01) |
| G06K 19/07 | (2006.01) |

(52) U.S. Cl.
CPC .............. *F42C 15/42* (2013.01); *F42C 13/04* (2013.01); *G06K 19/0723* (2013.01); *F42B 3/10* (2013.01)

(58) Field of Classification Search
CPC .......... F42C 15/42; F42C 13/04; F42C 15/20; F42C 13/00; F42C 15/00; F42C 15/40; F42C 17/04; G06K 19/0723; F42B 3/10; F42D 1/04; F42D 1/05; F42D 1/043
See application file for complete search history.

(56) References Cited

U.S. PATENT DOCUMENTS

| | | | | |
|---|---|---|---|---|
| 4,962,708 | A | * 10/1990 | Snyder | .................... F42D 1/045 |
| | | | | 102/275.6 |
| 7,383,882 | B2 | 6/2008 | Lerche et al. | |
| 2002/0121213 | A1* | 9/2002 | Micke | ........................ F42D 3/00 |
| | | | | 102/473 |
| 2006/0096490 | A1* | 5/2006 | Hsieh | ........................ F42B 8/26 |
| | | | | 102/498 |
| 2010/0300320 | A1* | 12/2010 | McGarraugh | ......... F42B 12/365 |
| | | | | 102/440 |
| 2011/0174181 | A1 | 7/2011 | Plummer et al. | |
| 2012/0011992 | A1 | 1/2012 | Rudakevych et al. | |
| 2016/0223310 | A1* | 8/2016 | Morris | .................... F42C 13/06 |

* cited by examiner

*Primary Examiner* — Michael D David
(74) *Attorney, Agent, or Firm* — The Roy Gross Law Firm, LLC; Roy D. Gross

(57) ABSTRACT

Provided herein are systems and methods for pairing a remote controller unit and a control unit, using a smart safety pin. More specifically, but not exclusively, disclosed are detonation control systems and methods, which include a detonation controller unit, a safety pin configured to engage with a safety pin holder of the detonation unit, and a remote controller unit configured to receive the safety pin, wherein, only when the safety pin is removed from the detonation controller unit and engaged with a remote controller unit, the remote controller unit is paired with the detonation controller unit and capable of communicating therewith.

20 Claims, 5 Drawing Sheets

DETONATION CONTROL SYSTEMS UTILIZING A SMART SAFETY PIN

CROSS REFERENCE TO RELATED APPLICATIONS

This application claims the benefit of priority of Israel Application No. 293692 filed Jun. 8, 2022, the contents of which are all incorporated herein by reference in their entirety

TECHNICAL FIELD

The present disclosure relates generally to systems and methods for pairing a remote controller unit and a control unit, using a smart safety pin. More specifically, but not exclusively, the disclosed systems and methods can be used for detonation control.

BACKGROUND

Detonation control system are used extensively in the field of military as well as civilian environments. Such systems aim to provide control and timing of detonation, to allow detonation at a requested time and space. The control of the detonation may include wired and wireless means. However, unintended or unauthorized activation associated with these systems, poses hazards when using such systems.

There is thus a need in the art for improved detonation control systems and methods that allow safe, convenient, secured and efficient pairing between remote controller units and corresponding detonation control units, using a safety pin, which can serve as an electro-mechanical safety mean to prevent unintended or unauthorized activation of detonation controller units.

SUMMARY

Aspects of the disclosure, according to some embodiments thereof, relate to advantageous methods and systems for controlling detonation in a safe and reliable manner. In particular, the systems and methods disclosed herein advantageously allow pairing a remote controller unit and a detonation controller unit using a smart safety pin, wherein the smart safety pin facilitates transferring unique identification information from the detonation controller unit to the remote controller unit to allow pairing and to ensure that only paired units ca communication therebetween.

According to some embodiments, the smart safety pin may further function as a mechanical/physical safety pin, preventing arming of the detonation controller unit, as long as the smart pin is engaged therewith.

According to some embodiments, the detonation controller unit has a Power-On switch and a removable safety pin which is configured to prevent unintended arming of the unit. In some embodiments, arming of the unit can occur only in a specific sequence. As long as the safety pin is not removed, the unit is disarmed ("SAFE").

According to some embodiments, the remote controller unit is incapable of sending any instructions/commands without the detonation control unit removable safety pin.

According to some embodiments, the electro-mechanical safety pin includes an NFC tag, and enables secure pairing, Inscription of the comm with digital keys embedded on the NFC TAG. In order to operate the system, mechanical detaching of the pin is required. In some embodiments, electrical sensing of the detachment is facilitated. In some embodiments, operation information (for example, type of detonator controller) may further be embedded with the NFC tag.

According to some embodiments, the systems and methods disclosed herein may be used in military environment (for example, but not limited to: use by infantry) and/or civilian environment (for example, engineering uses).

According to some embodiments, there is provided a detonation control system which includes:
  a detonation controller unit, said detonation controller unit includes a safety pin holder configured to engage with a safety pin, said safety pin includes an engagement element and an identification tag; wherein when said safety pin is engaged with the holder, the controller unit is disarmed;
  and
  a remote controller unit comprising a safety pin receiving holder, and a communication module; and
    wherein, only when said safety pin is removed from the pin holder and engaged with the safety pin receiving holder in the remote controller unit, the remote controller unit is paired with the detonation controller unit and capable of communicating therewith.

According to some embodiments, the detonation control system may further include one or more detonators, physically or functionally associated with the detonation controller unit.

According to some embodiments, operation of the detonator is configured to be controlled by the detonation controller unit, based on instructions from the remote controller unit. According to some embodiments, the detonator is a Low Energy Exploding Foil Initiator (LEEFI).

According to some embodiments, wherein the detonator may be integrated with the detonation controller unit.

According to some embodiments, the detonation controller may include an exploding foil initiator (EFI), a timer detonation, a proximity detonation, an impact detonation, an impact delay detonation, or any combinations thereof.

According to some embodiments, the engagement element of the safety pin is configured to physically secure the safety pin to the pin holder.

According to some embodiments, the engagement element may include a hinge, a pin, a spring, a latch, ratchet tooth, a magnet, a band, a ring, a hook, a groove, and the like, or any combination thereof.

According to some embodiments, the remote controller unit may include a plurality of safety pin receiving holders, each safety pin receiving holder is configured to associate with a safety pin of a respective detonation controller unit.

According to some embodiments, the identification tag of the smart pin may be selected from: near field communication (NFC), radio-frequency identification tag (RF-ID), Bluetooth, wired storage element, or any combination thereof.

According to some embodiments, the safety pin may include one or more integrated circuits, selected from: NFC chip, memory chip, FPGA, mini controller unit (MCU), cyclic redundancy check (CRC), Unique ID (UID) generator, or any combination thereof.

According to some embodiments, the safety pin may include one or more memory modules selected from: read only and read and write.

According to some embodiments, the detonation controller unit includes one or more of: integrated circuits, memory modules, wireless or wired identification tag, communication module, power source, alert module, user interface, or any combination thereof.

According to some embodiments, the detonation controller unit is configured to read information from the safety pin and/or write information to the safety pin.

According to some embodiments, the detonation controller unit is configured to read the identification tag of the safety pin and/or write to the safety pin memory module information regarding one or more of: MCU factory programmed UID, FPGA UID or MCU address of the detonation controller unit.

According to some embodiments, the remote controller unit may include one or more of: integrated circuits, memory modules, wireless identification tag, power source, user interface, alert unit, or any combination thereof.

According to some embodiments, the remote controller unit is configured to read the identification tag of the safety pin and/or additional information from the memory module of the safety pin.

According to some embodiments, the additional information from the memory module of the safety pin may include information written to the safety pin memory module by the detonation controller unit.

According to some embodiments, the communication module of the remote controller unit may include RF communication module, and/or wired communication module.

According to some embodiments, the communication module of the detonation controller unit may include RF communication module and/or wired communication module.

According to some embodiments, the detonation controller unit may be disposable.

According to some embodiments, the system may include a plurality of detonator controller units, each of the detonation controller units is configured to be paired with the same remote controller unit, via a respective smart pin.

According to some embodiments, there is provided a method for controlling a detonation system, the method includes:
  removing a safety pin engaged with a first safety pin holder of a detonation controller unit, said safety pin comprises an engagement element and an identification tag, wherein prior to removal of the safety pin, the detonation controller unit is disarmed;
  placing the safety pin in a safety pin receiving holder of a remote controller device;
  wherein when said safety pin is engaged with the safety pin receiving holder in the remote controller unit, the remote controller unit is paired with the detonation controller unit and capable of communicating therewith, to allow controlling of the detonating system.

According to some embodiments, the detonation controller unit may be physically and/or functionally associated with one or more detonators.

According to some embodiments, the method may include repeating the steps of removing a safety pin engaged with a first safety pin holder of another detonation controller unit, and placing the safety pin in another safety pin receiving holder of a remote controller device for a plurality of times, for example, 3 times, thereby pairing the remote controller unit with three distinct detonation controller units.

According to some embodiments, the detonation controller unit is configured to read information from the safety pin and/or write information to a memory module of the safety pin.

According to some embodiments, the detonation controller unit is configured to read the identification tag of the safety pin and/or write to the safety pin memory module information regarding one or more of: MCU factory programmed UID, FPGA UID and MCU address of the detonation controller unit.

According to some embodiments, the remote controller unit is configured to read the identification tag of the safety pin and/or additional information from the memory module of the safety pin.

According to some embodiments, the additional information from the memory module of the safety pin comprises information written to the safety pin memory module by the detonation controller unit.

According to some embodiments, the method may further include transmitting information, data and/or operating instructions, between the remote controller unit and the paired detonation controller unit.

According to some embodiments, there is provided a method of pairing a remote control unit and a controller unit using a smart pin, the method includes engaging the smart pin with the controller unit, wherein said engaging comprises obtaining identification data from said controller unit; removing said smart pin from the controller unit; and engaging the smart pin with the remote controller unit, wherein said engaging allows obtaining at least the identification data of the controller unit from the smart pin, to thereby facilitate pairing between the controller unit and the remote control unit, such that the controller unit is capable communicating and being controlled only by said paired remote controller unit.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the figures:

FIG. 1B—A schematic perspective view of an exemplary remote controller unit of a detonation control system, having a smart safety pin associated therewith, according to some embodiments;

FIG. 1C—A schematic diagram of a remote controller unit of a detonation control system, according to some embodiments;

FIG. 4B—A schematic zoom-in side view of detonation controller unit engaged with a smart safety pin, according to some embodiments;

FIG. 4C—A schematic perspective view of a detonation controller unit having a smart safety pin removed therefrom, according to some embodiments;

DETAILED DESCRIPTION

Figure 1A:
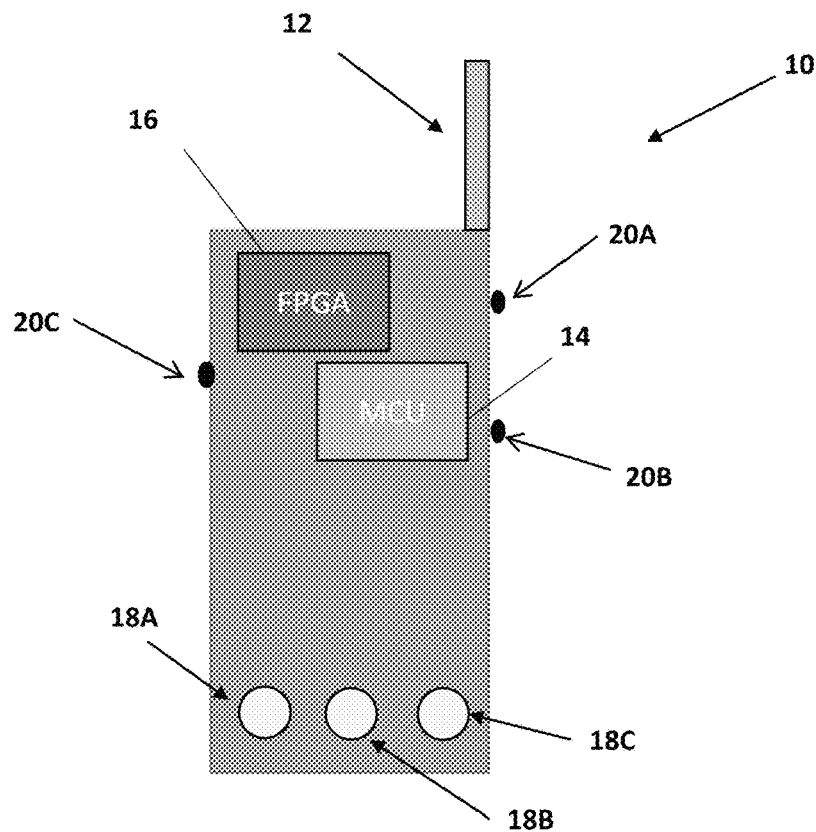
FIG. 1A—A schematic illustration of a remote controller unit of a detonation control system, according to some embodiments.

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the following description, various aspects of the invention will be described. For the purpose of explanation, specific details are set forth in order to provide a thorough understanding of the invention. However, it will also be apparent to one skilled in the art that the invention may be practiced without specific details being presented herein. Furthermore, well-known features may be omitted or simplified in order not to obscure the invention.

According to some embodiments, there are provided herein advantageous systems and method for pairing a remote controller unit and a detonation controller unit, using a smart pin, to allow safe communication only between paired units that are/have been associated with the smart pin.

Reference is now made to FIG. 1A, which depicts a schematic illustration of a remote controller unit of a detonation control system, according to some embodiments. As shown in FIG. 1. As shown in FIG. 1A, remote controller unit 10, includes a housing, which may be regird, or semi rigid. The housing may be made of any suitable material, including, for example, metal, plastic, aluminum, and the like. Remote controller 10 may include an antenna 12, configured to allow communication with one or more (paired) respective detonation controller unit(s). Antenna 12 may be any type of Antenna, allowing RF, or any other suitable route of communication, between the remote controller units and a detonation controller unit. The remote controller 10 may further include one or more user interface elements (shown as exemplary buttons 20A-C), which may allow operating, controlling and/or providing operating information of the remote controller. In some embodiments, the user interface elements may include, power switch, power buttons, control buttons, indication means (such as, audible, visual (light, screen/monitor, etc.), and the like, or any combination thereof. Additionally, remote controller 10 further includes one or more integrated circuits, memory modules and/or communication modules. Shown in FIG. 1A, is exemplary FPGA (Field programmable gate array) 16 and Mini controller unit (MCU), which are configured to allow operation and communication of the remote controller with a smart safety pin (as detailed below), for example, by obtaining (for example, by reading) detonation controller related information form the smart safety pin, and thereafter allow pairing of the remote controller with a corresponding detonation controller system. The integrated circuits, memory modules and/or communication modules are preferably housed within the remote controller housing. The remote controller 10 further includes one or more smart safety pin holder(s), shown as exemplary holders 18A-C. The smart safety pin holders are configured to interact (engage, associate) with a smart pin. The interaction may include physical/mechanical association and/or electrical association, such that information stored on the smart safety pin may be accessed by the remote controller, to allow pairing/matching of the remote controller with a detonation controller unit (from which the respective safety smart pin has been retrieved).

Figure 1B:
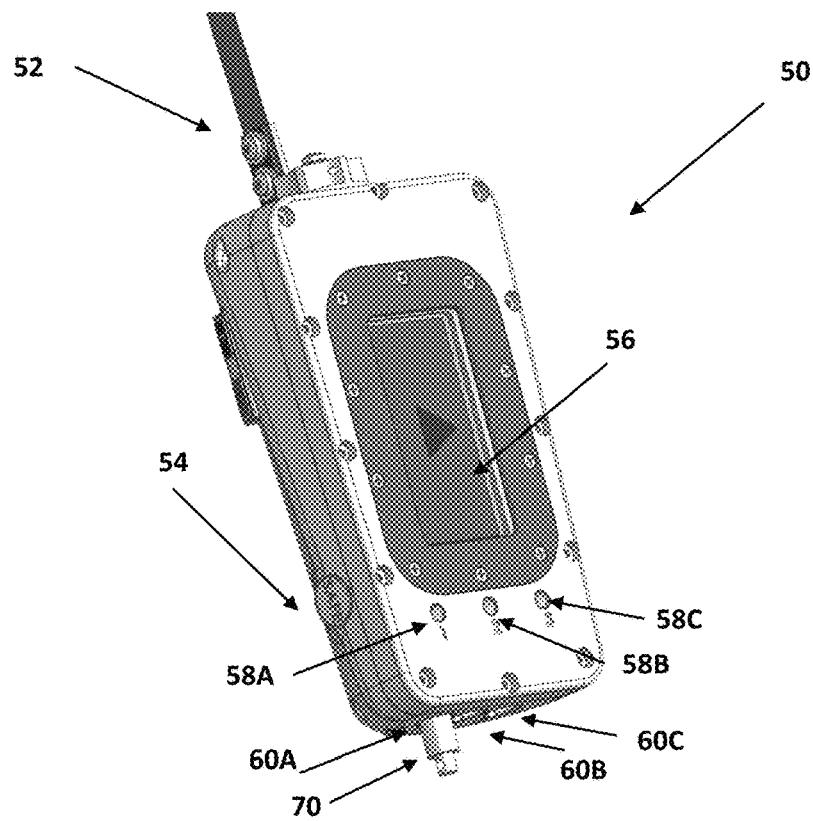

Reference is now made to FIG. 1B, which shown a schematic perspective view of an exemplary remote controller unit of a detonation control system, according to some embodiments. As shown in FIG. 1B, remote controller 50, includes a housing, which may be regird, or semi rigid and may be made of any suitable material, including, for example, metal, plastic, aluminum, and the like. Remote controller 50 may include an antenna 52, configured to allow communication with one or more (paired) respective detonation controller unit(s), as detailed herein below. Remote controller 50 may further include one or more user interface elements which may allow operating, controlling and/or providing operating information of the remote controller. Shown in FIG. 1B are exemplary user interface elements, including, operating button 54, touch-display 56 and indication lights 58A-C. Further, remote controller unit 50 includes smart pin holders, shown as holders 60A-C, which are configured to associate with a respective smart safety pin, retrieved from a detonation controller unit, as detailed herein. Further shown in FIG. 1B, is exemplary smart safety pin 70, which is associated with holder 60A.

Figure 1C:
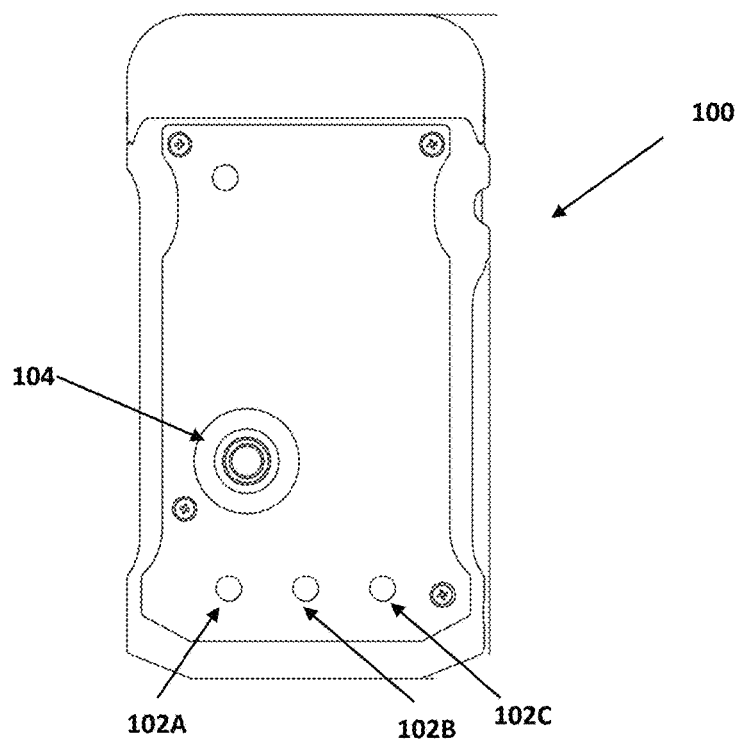

Reference is now made to FIG. 1C, which shows yet another schematic diagram of a remote controller unit of a detonation control system, according to some embodiments. As shown in FIG. 1A, remote controller unit 100, includes at least one user interface module, shown as exemplary operating button 104. The remote controller may further include one or more smart safety pin holder(s), shown as pin holders 102A-C, allowing a smart safety pin to interact with a respective pin holder.

According to some embodiments, the smart safety pin disclosed herein may be used for several purposes, including, a mechanical/physical safety element, an electronic safety element and as a pairing element, which allows a precise, reliable and safe pairing/matching between a remote controller units and specific detonation controller units. In some embodiments, as detailed herein, the smart safety pin is configured to interact/engage/associate with a respective holder in the detonation controller unit. As long as the smart safety pin is engaged with the holder, the controller unit is prevented from being activated/armed. Once the controller unit is powered on, it may obtain/acquire/read specific information from the smart safety pin (for example, unique identification thereof), and the smart safety pin may obtain/acquire/read/be provided with specific information from the controller unit and further save/store such information. Once the smart safety pin is physically/mechanically removed from its holder (i.e., by un-engaging the engaging elements), it may be associated with a respective holder in a remote controller unit ("safety pin receiving holder"). Once accessed, the remote controller unit may obtain additional information from the smart safety pin, to thereby provide identification with respect of the specific detonation controller unit and allow pairing/matching between the specific detonation controller unit and the remote controller unit, such that only the paired remote controller unit can communicate with the respective paired controller unit, to allow operation thereof. In some embodiments, the remote unit cannot send any commands (instructions) to the detonation controller unit, without being engaged first with the smart safety pin.

According to some embodiments, the smart safety pin (also referred to herein as "smart catch") may acquire any desired shape or size and may be adjusted to fit respective holder/opening in a remote controller unit and detonation controller units. The smart safety pin includes a housing, which is preferably rigid or semi rigid and may further include one or more physical/mechanical engagement elements, configured to secure the smart pin in a respective holder, to prevent unwanted, accidental, premature or unauthorized removal thereof. The engagement element of the smart safety pin may be physically/mechanically engaged with corresponding elements in the detonation controller unit. In some embodiments, the engagement element may be selected from pins, grooves, hinges, rings, latches, ratchet tooth, springs, hooks, belts, collars, and the like, or any combination thereof.

In some embodiments, the smart safety pin includes a wired or wireless identification tag, which includes a unique identifier, used for recognition by the remote controller unit and the detonation controller unit. In some embodiments, the smart safety pin may further include one or more integrated circuits selected from: NFC chip, memory chip, FPGA, mini controller unit (MCU), cyclic redundancy check (CRC), Unique ID (UID) generator, memory modules, or any combination thereof.

Figure 2:
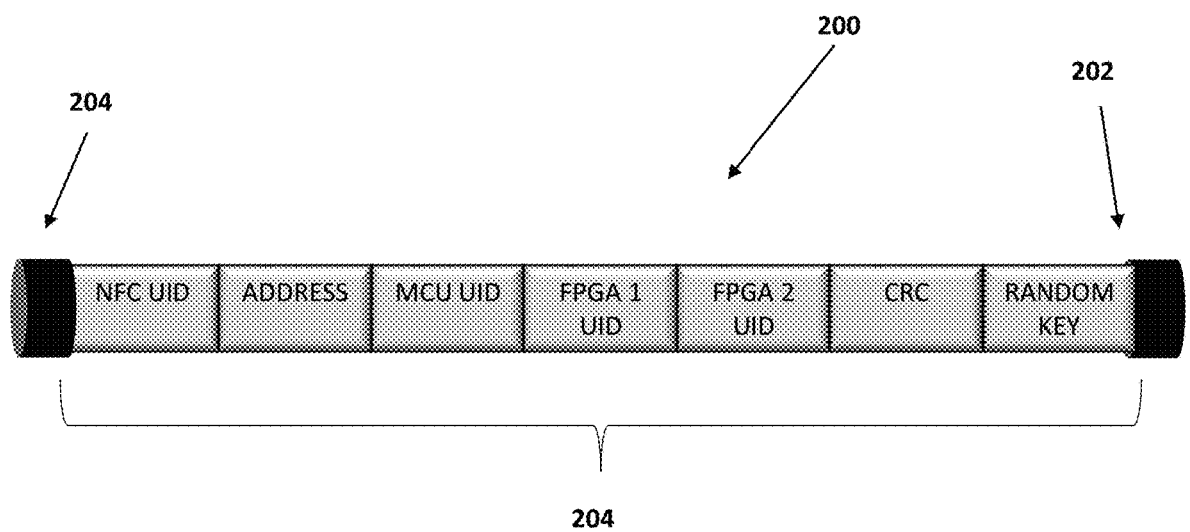
FIG. 2—A schematic illustration of a smart safety pin, according to some embodiments.

Reference is now made to FIG. 2, which shows a schematic illustration of a smart safety pin, according to some embodiments. As shown in FIG. 2, elongated safety pin 200 includes engagement elements 202 and 204, and computation module unit 204, which is placed within the housing of the safety pin. Exemplary computational module unit 204 shown in FIG. 2, includes one or more integrated circuits, memory modules, identification tags, CRCs, UID generator, and the like, allowing the smart pin to provide information to the detonation controller unit, received (read) information from the detonation controller unit, write (store) information from the detonation controller unit, provide (i.e., allowing reading) information to the remote controller unit, and the like. In some embodiments, the memory module of the smart pin may be read only or read/write, depending on the configuration and timing of use.

Figure 3:
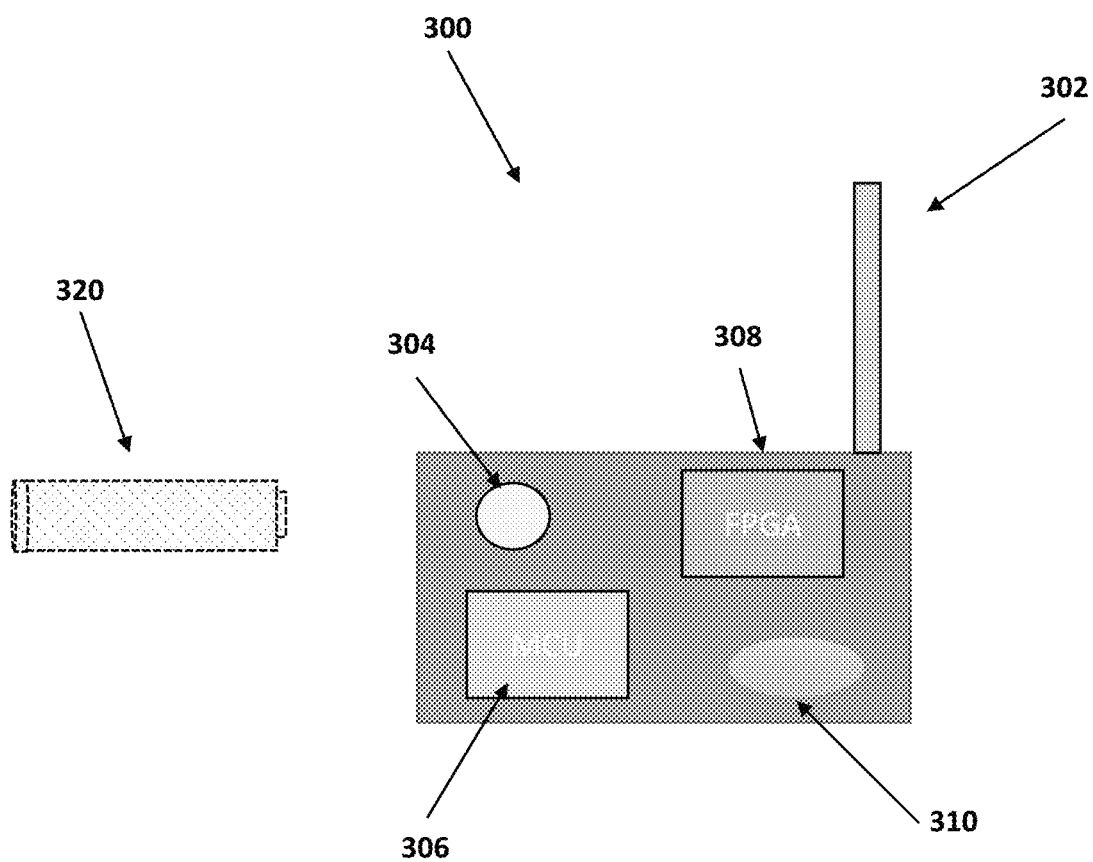
FIG. 3—A schematic perspective view of an exemplary of a detonation controller unit, according to some embodiments.

Reference is now made to FIG. 3, showing a schematic perspective view of an exemplary of a detonation controller unit, according to some embodiments. As shown in FIG. 3, detonation controller unit 300, includes a housing, which may be regird, or semi rigid. The housing may be made of any suitable material, including, for example, metal, plastic, aluminum, and the like. Detonation controller 300 may include an antenna 302, configured to allow communication with a (paired) respective remote controller unit. Antenna 302 may be any type of Antenna, allowing RF, or any other suitable route of communication (including wired communication), between the detonation controller unit and the remote controller unit. The detonation controller 300 may further include one or more user interface elements, which may allow operating, controlling and/or providing operating information of the remote controller. In some embodiments, the user interface elements may include, power switch, power buttons, indication means (such as, audible, visual (light, screen/monitor, etc.), and the like, or any combination thereof. Additionally, detonation controller 300 may further include one or more integrated circuits, memory modules and/or communication modules. Shown in FIG. 3, is exemplary FPGA 308 and mini controller unit (MCU) 306, which are configured, inter alia, to allow communication of the detonation controller with a smart safety pin (shown as exemplary safety pin 320, in FIG. 3). Such information may include, for example, obtaining (for example, by reading) unique identification information from the smart safety pin, and providing information to the smart safety pin, to ultimately allow pairing between the specific detonation controller unit and the remote controller. The integrated circuits, memory modules and/or communication modules are preferably housed within the detonation controller unit controller housing. The detonation controller unit 300 further includes a smart safety pin holder, shown as exemplary holder 304. The smart safety pin holder is configured to interact (engage, associate) with a smart pin, using one or more engagement elements, which correspond to respective engagement elements of the smart safety pin. The interaction includes physical/mechanical association which prevents unwanted, accidental, premature or unauthorized removal of the safety pin. The detonation controller unit is further configured to be associated with a detonator 310. The association with the detonator may be permanent or transient. In some embodiments, the detonator may be an integral part of the detonation controller unit. In some embodiments, the detonator may be reversibly associate with the detonation controller unit.

According to some embodiments, during production of the detonator controller unit, the MCU and/or FPGA may be programed with the unique values, such as, for example, FPGA UID, MCU address, and the like.

According to some exemplary embodiments, when the smart pin is engaged with detonation controller unit, the controller unit (for example, the NFC tag) can read information from the smart pin (for example, NFC tag factory programmed UID, and write information to the smart pin (for example, MCU factory programmed UID, FPGA UID, MCU address flashed in production, and the like).

According to some embodiments, after removing the safety pin from the detonation controller unit, the safety pin includes all the parameters/information to properly communicate and arm the unit (once activated by the remote controller unit).

According to some embodiments, for each command sent/provided from the remote controller unit to the detonation controller unit, requires associate with the safety pin.

Figure 4A:
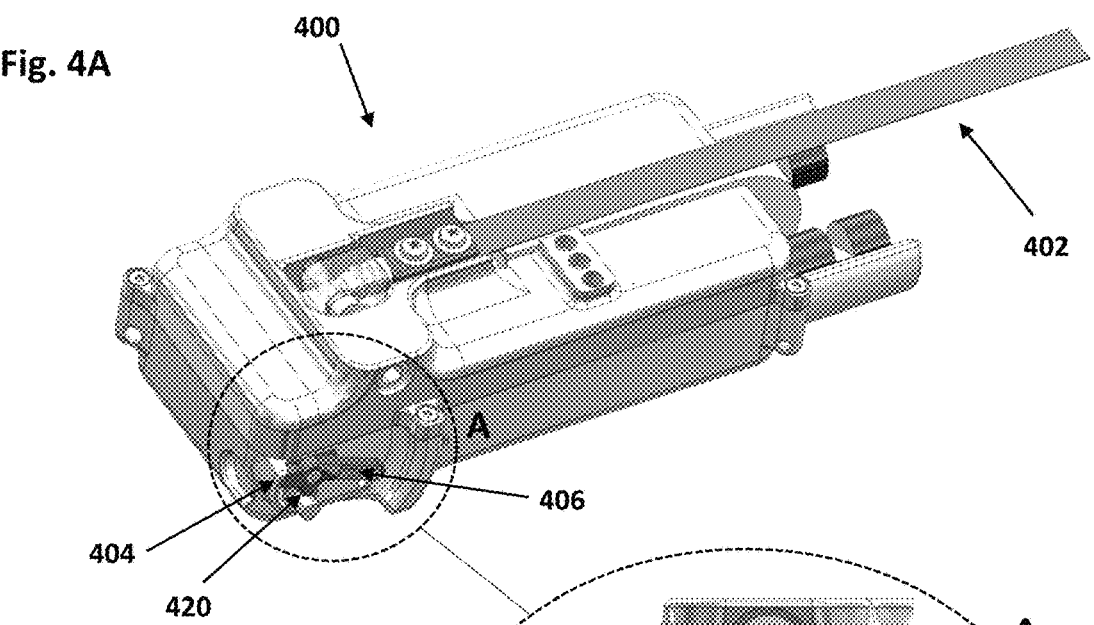
FIG. 4A—A schematic perspective view of a detonation controller unit of a detonation control system engaged with a smart safety pin, according to some embodiments.
Figure 4B:
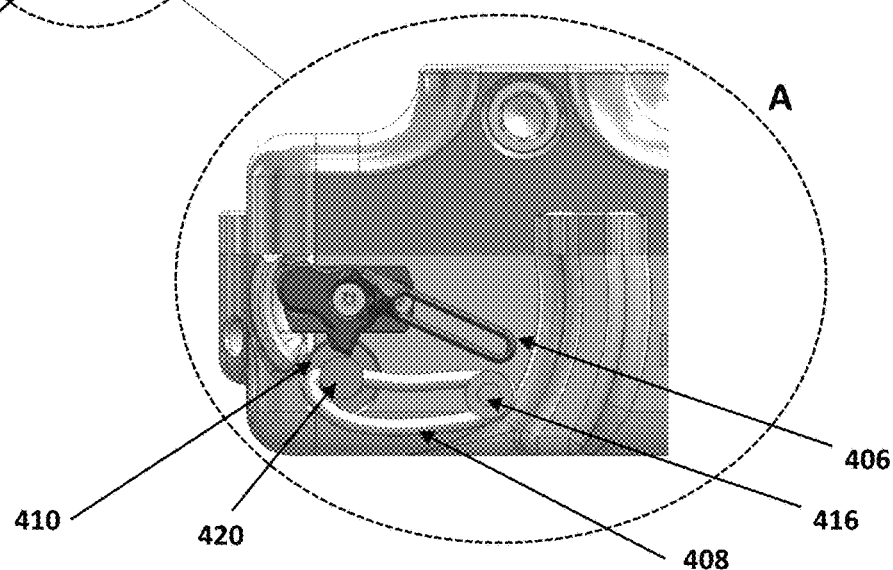
Figure 4C:
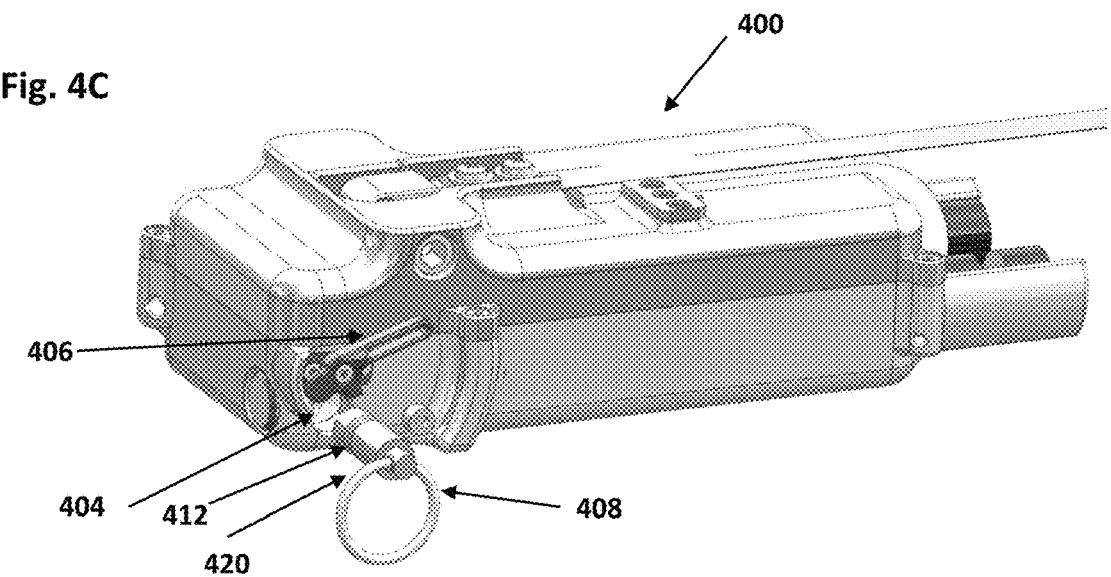

Reference is now made to FIG. 4A, which shows a schematic perspective view of a detonation controller unit of a detonation control system, engaged with a smart safety pin, according to some embodiments. As shown in FIG. 4A, detonation controller unit 400 includes antenna 402. Further shown is smart pin holder 400 holding smart safety pin 420. Smart safety pin 420 is engaged/secured to the holder, via one or more engagement units. The engagement unit may include an engagement portion 406, which is configured to interact with a corresponding engagement element of the smart safety pin. As shown in FIG. 4A, engagement portion 406 is in the form of a moveable latch, which can move from a closed configuration (holding the safety pin in its holder), or closed configuration (allowing removal of the safety pin from its holder). Reference is now made to FIG. 4B, which shows a schematic zoom-in side view of detonation controller unit 400, engaged with a smart safety pin, according to some embodiments. As shown in FIG. 4B, which illustrates a zoom in-view of region A of FIG. 4A, smart safety pin 420 is held is its pin holder 404, via engagement portion 406, and via another engagement element 408, which is in a form of a bank configured to attach to the smart safety pin on the one end and to hook 416 on the detonator controller unit. Reference is now made to FIG. 4C, which shows a schematic perspective view of detonation controller unit 400 having a smart safety pin removed therefrom, according to some embodiments. As shown in FIG. 4C, smart safety pin 420 is removed from held is its pin holder 404. Further shown is exemplary engagement element 412 of smart pin 420, which is in the form of a groove configured to fit with engagement portion 406, shown in FIG. 4C in an open position. Further shown is engagement element 408, in open position, after being released from its holding hook 416.

Figure 5:
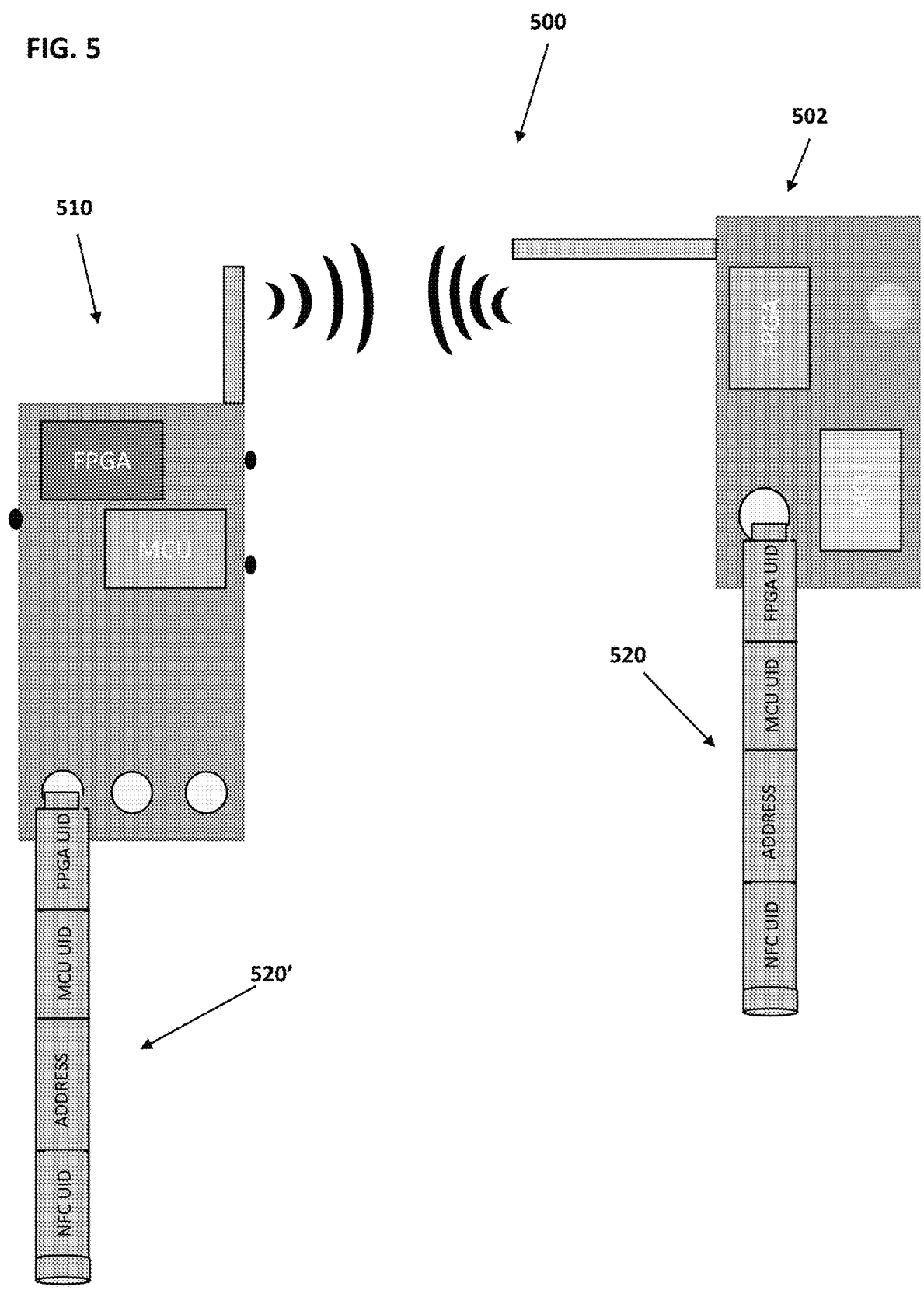
FIG. 5—A schematic illustration of a detonation control system, according to some embodiments.

Reference is now made to FIG. 5, which shows a schematic illustration of a detonation control system, according to some embodiments. As shown in FIG. 5, detonation control system 500 includes remote controller unit 510 and at least one detonation controller unit 502. Smart safety pin 520 is first associated with detonation controller unit 502, as detailed herein. As long as they are associated, the detonation controller system is not armed (i.e., in safe mode). Once the smart safety pin is removed from the detonation controller unit (after reading/writing identification and/or any other information to/from the detonation controller unit), the smart safety pin 520' (which includes, inter alia, unique identification information from the detonation controller unit), can associate with the remote controller unit 510 (via wireless or wired means), to allow the remote controller unit to obtain (read) information from the smart safety pin and allow pairing with the respective controller detonation unit.

According to some embodiments, each remote controller unit may pair with a plurality of detonation controller units. For example, a remote controller unit may pair with one, two, three or more detonation controller units. According to some embodiments, once paired, only a paired/matched remote controller unit can control/communicate with a detonation controller unit.

As user herein, the term "detonation control unit" and "detonation controller unit" may be used interchangeably.

As user herein, the term "remote control unit" and "remote controller unit" may be used interchangeably.

As used herein, the terms "safety pin", "pin", "smart safety pin", "smart catch" and "smart safety catch" may interchangeably be used.

According to some embodiments, each of the remote controller unit, detonation controller unit and smart pin may include a memory module and/or a processing module. According to some embodiments, terms such as "processing", "computing", "determining", or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

In the description and claims of the application, the words "include" and "have", and forms thereof, are not limited to members in a list with which the words may be associated.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

What is claimed is:

1. A detonation control system comprising:
   a detonation controller unit, said detonation controller unit comprising a safety pin holder configured to engage with a safety pin, said safety pin comprises an engagement element and an identification tag; wherein when said safety pin is engaged with the holder, the controller unit is disarmed;
   and
   a remote controller unit comprising a safety pin receiving holder and a communication module;
   wherein, only when said safety pin is removed from the pin holder and engaged with the safety pin receiving holder in the remote controller unit, the remote controller unit is paired with the detonation controller unit and capable of communicating therewith.

2. The detonation control system according to claim 1, further comprising one or more detonators physically or functionally associated with the detonation controller unit.

3. The detonation control system according to claim 2, wherein operation of the detonator is configured to be controlled by the detonation controller unit, based on instructions from the remote controller unit.

4. The detonation control system according to claim 2, wherein the detonator is a Low Energy Exploding Foil Initiator (LEEFI).

5. The detonation control system according to claim 2, wherein the detonator is integrated with the detonation controller unit.

6. The detonation control system according to claim 1, wherein the detonation controller comprises an exploding foil initiator (EFI), a timer detonation, a proximity detonation, an impact detonation, an impact delay detonation, or any combinations thereof.

7. The detonation control system according to claim 1, wherein the engagement element of the safety pin is configured to physically secure the safety pin to the pin holder.

8. The detonation control system according to claim 1, wherein the remote controller unit comprises a plurality of safety pin receiving holders, each safety pin receiving holder is configured to associate with a safety pin of a respective detonation controller unit.

9. The detonation control system according to claim 1, wherein the identification tag is selected from: near field communication (NFC), radio-frequency identification tag (RF-ID), Bluetooth, wired storage element, or any combination thereof; and/or wherein the safety pin comprises one or more integrated circuits selected from: NFC chip, memory chip, FPGA, mini controller unit (MCU), cyclic redundancy check (CRC), Unique ID (UID) generator, or any combination thereof.

10. The detonation control system according to claim 1, wherein the safety pin comprises one or more memory modules selected from: read only and read and write.

11. The detonation control system according to claim 1, wherein the detonation controller unit comprises one or more of: integrated circuits, memory modules, wireless or wired identification tag, communication module, power source, alert module, user interface, or any combination thereof.

12. The detonation control system according to claim 1, wherein the detonation controller unit is configured to read information from the safety pin and/or write information to the safety pin.

13. The detonation control system according to claim 12, wherein the detonation controller unit is configured to read the identification tag of the safety pin and/or write to the safety pin memory module information regarding one or more of: MCU factory programmed UID, FPGA UID or MCU address of the detonation controller unit.

14. The detonation control system according to claim 1, wherein the remote controller unit comprises one or more of: integrated circuits, memory modules, wireless identification tag, power source, user interface, alert unit, or any combination thereof.

15. The detonation control system according to claim 14, wherein the remote controller unit is configured to read the identification tag of the safety pin and/or additional information from the memory module of the safety pin.

16. The detonation control system according to claim 15, wherein the additional information from the memory module of the safety pin comprises information written to the safety pin memory module by the detonation controller unit.

17. The detonation control system according to claim 1, wherein the communication module of the remote controller unit comprises RF communication module and/or wherein the communication module of the detonation controller unit comprises RF communication module.

18. A method for controlling a detonation system, the method comprising:
removing a safety pin engaged with a first safety pin holder of a detonation controller unit, said safety pin comprises an engagement element and an identification tag, wherein prior to removal of the safety pin, the detonation controller unit is disarmed;
placing the safety pin in a safety pin receiving holder of a remote controller device;
wherein when said safety pin is engaged with the safety pin receiving holder in the remote controller unit, the remote controller unit is paired with the detonation controller unit and capable of communicating therewith, to allow controlling of the detonating system.

19. The method according to claim 18, comprising repeating the steps of removing a safety pin engaged with a first safety pin holder of another detonation controller unit, and placing the safety pin in another safety pin receiving holder of a remote controller device for a plurality of times.

20. The method according to claim 18, further comprising transmitting information, data and/or operating instructions, between the remote controller unit and the paired detonation controller unit.

* * * * *